US011084918B2

(12) United States Patent
Kodemura et al.

(10) Patent No.: US 11,084,918 B2
(45) Date of Patent: Aug. 10, 2021

(54) METHOD FOR PRODUCING SYNTHETIC POLYISOPRENE LATEX

(71) Applicant: ZEON CORPORATION, Tokyo (JP)

(72) Inventors: Junji Kodemura, Tokyo (JP); Shunjin Aihara, Tokyo (JP); Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 217 days.

(21) Appl. No.: 16/346,857

(22) PCT Filed: Nov. 2, 2017

(86) PCT No.: PCT/JP2017/039739
§ 371 (c)(1),
(2) Date: May 1, 2019

(87) PCT Pub. No.: WO2018/092603
PCT Pub. Date: May 24, 2018

(65) Prior Publication Data
US 2020/0062936 A1    Feb. 27, 2020

(30) Foreign Application Priority Data

Nov. 15, 2016    (JP) ............... JP2016-222312

(51) Int. Cl.
| | |
|---|---|
| C08C 2/06 | (2006.01) |
| C08C 3/00 | (2006.01) |
| C08C 19/00 | (2006.01) |
| C08L 9/10 | (2006.01) |
| B29C 41/00 | (2006.01) |
| B29C 41/14 | (2006.01) |
| B65D 65/42 | (2006.01) |
| C09D 109/10 | (2006.01) |
| B29K 105/00 | (2006.01) |

(52) U.S. Cl.
CPC .............. *C08L 9/10* (2013.01); *B29C 41/003* (2013.01); *B29C 41/14* (2013.01); *B65D 65/42* (2013.01); *C08C 2/06* (2013.01); *C08C 3/00* (2013.01); *C08C 19/00* (2013.01); *C09D 109/10* (2013.01); *B29K 2105/0064* (2013.01); *C08L 2201/52* (2013.01); *C08L 2205/025* (2013.01); *C08L 2312/00* (2013.01)

(58) Field of Classification Search
CPC ..... C08L 9/10; C08C 2/06; C08C 3/00; C08C 19/00; B29C 41/00
USPC ....................................................... 524/501
See application file for complete search history.

(56) References Cited

FOREIGN PATENT DOCUMENTS

| | | | |
|---|---|---|---|
| JP | 2015105278 A | * | 6/2015 |
| JP | 2016-138212 A | | 8/2016 |

OTHER PUBLICATIONS

Jan. 23, 2018 International Search Report issued in International Patent Application No. PCT/JP2017/039739.

\* cited by examiner

*Primary Examiner* — Deve V Hall
(74) *Attorney, Agent, or Firm* — Oliff PLC

(57) ABSTRACT

A method for producing a synthetic polyisoprene latex, including a step of mixing a latex of synthetic polyisoprene (A) synthesized by use of a Ziegler type catalyst and a latex of synthetic polyisoprene (B) synthesized by use of an organic alkali metal catalyst at a weight ratio of "synthetic polyisoprene (A): synthetic polyisoprene (B)=10:90 to 90:10". In the method, preferably, the weight average molecular weight of the synthetic polyisoprene (A) is 100,000 to 3,000,000 and the weight average molecular weight of the synthetic polyisoprene (B) is 1,000,000 to 5,000,000.

10 Claims, No Drawings

METHOD FOR PRODUCING SYNTHETIC POLYISOPRENE LATEX

TECHNICAL FIELD

The present invention relates to a method for producing a synthetic polyisoprene latex that is excellent in film formability and that can provide a dip formed article not only excellent in tensile strength and elongation, but also having a flexible texture, as well as a method for producing a latex composition, a method for producing a dip formed article and a method for producing a packaging structure, by use of a synthetic polyisoprene latex obtained by such a production method.

Background Art

It has been conventionally known that a dip formed article for use in contact with the human body, such as a nipple, an air ball, a glove, a balloon and a sack, is obtained by dip forming of a latex composition containing a latex of natural rubber. A latex of natural rubber, however, contains a protein causing an allergy symptom in the human body, and thus is problematic in terms of use in a dip formed article that is in direct contact with the mucous membrane or organs of a living body. Therefore, studies about use of not a latex of natural rubber, but a latex of synthetic rubber have been increasingly made.

For example, Patent Document 1 discloses a latex of synthetic polyisoprene, as a latex for use in dip forming. The technique of Patent Document 1, however, has the problem of being inferior in film formability in dip forming, depending on the synthetic polyisoprene used, resulting in a reduction in tensile strength of the resulting dip formed article.

Related Art

PATENT DOCUMENT

Patent Document 1: Japanese Patent Laid-Open No. 2016-138212

SUMMARY OF THE INVENTION

Problem to be Solved by the Invention

The present invention has been made in view of such circumstances, and an object thereof is to provide a method for producing a synthetic polyisoprene latex that is excellent in film formability and that can provide a dip formed article not only excellent in tensile strength and elongation, but also having a flexible texture.

Means for Solving the Problem

The present inventors have made intensive studies in order to achieve the above object, and as a result, have found that the above object can be achieved by mixing a latex of synthetic polyisoprene (A) synthesized by use of a Ziegler type catalyst and a latex of synthetic polyisoprene (B) synthesized by use of an organic alkali metal catalyst at a predetermined weight ratio, thereby leading to completion of the present invention.

That is, according to the present invention, provided is a method for producing a synthetic polyisoprene latex, including a step of mixing a latex of synthetic polyisoprene (A) synthesized by use of a Ziegler type catalyst and a latex of synthetic polyisoprene (B) synthesized by use of an organic alkali metal catalyst at a weight ratio of "synthetic polyisoprene (A): synthetic polyisoprene (B)=10:90 to 90:10".

It is preferable in the present invention that a weight average molecular weight of the synthetic polyisoprene (A) be 100,000 to 3,000,000 and a weight average molecular weight of the synthetic polyisoprene (B) be 1,000,000 to 5,000,000.

It is preferable in the present invention that the latex of synthetic polyisoprene (A) be obtained by once coagulating a polymer solution of synthetic polyisoprene (A) obtained by solution polymerization, in the presence of the Ziegler type catalyst, of isoprene dissolved in an organic solvent, to provide a solid material, re-dissolving the solid material in an organic solvent, and emulsifying the resultant obtained by re-dissolving by use of an aqueous surfactant solution.

It is preferable in the present invention that the latex of synthetic polyisoprene (B) be obtained by directly emulsifying a polymer solution of synthetic polyisoprene (B) obtained by solution polymerization, in the presence of the organic alkali metal catalyst, of isoprene dissolved in an organic solvent, by use of an aqueous surfactant solution without any coagulation.

It is preferable in the present invention that a catalytic system with titanium tetrachloride and an organoaluminum compound be used as the Ziegler type catalyst.

It is preferable in the present invention that an organomonolithium compound be used as the organic alkali metal catalyst.

It is preferable in the present invention that a solid content concentration of the latex of synthetic polyisoprene (A) be 30 to 70% by weight and a solid content concentration of the latex of synthetic polyisoprene (B) be 30 to 70% by weight in mixing of the latex of synthetic polyisoprene (A) and the latex of synthetic polyisoprene (B).

Moreover, according to the present invention, provided is a method for producing a latex composition, including a step of adding a cross-linking agent to a synthetic polyisoprene latex obtained by the production method.

Furthermore, according to the present invention, provided is a method for producing a dip formed article, including a step of dip forming a latex composition obtained by the production method.

Furthermore, according to the present invention, provided is a method for producing a packaging structure that can receive an object to be packaged between a first sheet substrate and a second sheet substrate, including coating the first sheet substrate and/or the second sheet substrate with a synthetic polyisoprene latex obtained by the production method, to form a coating film, and performing adhesion and stacking of at least a part of the first sheet substrate and at least a part of the second sheet substrate thorough the coating film.

Effects of Invention

According to the present invention, there can be provided a method for producing a synthetic polyisoprene latex that is excellent in film formability and that can provide a dip formed article not only excellent in tensile strength and elongation, but also having a flexible texture, as well as a method for producing a latex composition, a method for producing a dip formed article and a method for producing a packaging structure, by use of a synthetic polyisoprene latex obtained by such a production method.

DESCRIPTION OF EMBODIMENTS

The method for producing a synthetic polyisoprene latex of the present invention includes a step of mixing a latex of synthetic polyisoprene (A) synthesized by use of a Ziegler type catalyst (hereinafter, sometimes referred to as "Ziegler-derived synthetic polyisoprene latex".), and a latex of synthetic polyisoprene synthesized by use of an organic alkali metal catalyst (hereinafter, sometimes referred to as "organic alkali metal-derived synthetic polyisoprene latex".) at a weight ratio of "synthetic polyisoprene (A): synthetic polyisoprene 10:90 to 90:10".

Ziegler-Derived Synthetic Polyisoprene Latex

First, the latex of synthetic polyisoprene (A) (Ziegler-derived synthetic polyisoprene latex) for use in the production method of the present invention is described.

The synthetic polyisoprene (A) constituting the Ziegler-derived synthetic polyisoprene latex for use in the production method of the present invention may be synthesized by use of a Ziegler type catalyst, and can be obtained by solution polymerization of isoprene and, if necessary, other ethylenically unsaturated monomer copolymerizable therewith in an inert organic solvent by use of a Ziegler type catalyst. While a polymer solution of the synthetic polyisoprene (A) obtained by solution polymerization may be used as it is for production of the latex of synthetic polyisoprene (A), the polymer solution is preferably used for production of the latex of synthetic polyisoprene (A) after a solid synthetic polyisoprene (A) is taken out by coagulation from the polymer solution once and thereafter re-dissolved in an organic solvent.

Here, impurities such as a residue of a polymerization catalyst, remaining in the polymer solution after synthesis, may be removed. An antioxidant described below may also be added to a solution during polymerization or after polymerization. A commercially available solid synthetic polyisoprene (A) can also be used.

The Ziegler type catalyst for use in synthesis of the synthetic polyisoprene (A) is not particularly limited, a known catalyst can be used, and examples thereof include a catalytic system where a titanium trichloride composition obtained by reducing titanium tetrachloride with an organoaluminum compound and further treating the resultant with any of various electron donors and electron acceptors is combined with an organoaluminum compound, and a supported catalytic system obtained by bringing magnesium halide into contact with titanium tetrachloride and any of various electron donors. In particular, a catalytic system with titanium tetrachloride and an organoaluminum compound is preferable, and a catalytic system with titanium tetrachloride and trialkyl aluminum is particularly preferable.

The synthetic polyisoprene (A) may be synthesized by use of the Above-mentioned Ziegler type catalyst, and may be a homopolymer of isoprene or may be copolymerized with other ethylenically unsaturated monomer copolymerizable with isoprene. The content of the isoprene unit in the synthetic polyisoprene (A) is preferably 70% by weight or more, more preferably 90% by weight or more, further preferably 95% by weight or more, particularly preferably 100% by weight (homopolymer of isoprene) based on the total monomer unit from the viewpoint that a flexible dip formed article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/or methyl methacrylate", hereinafter, much the same is true on ethyl (meth)acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

The isoprene unit in the synthetic polyisoprene (A) is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene (A) is preferably 70% by weight or more, more preferably 90% by weight or more, further preferably 95% by weight or more based on the total isoprene unit from the viewpoint of an enhancement in tensile strength of the resulting dip formed article.

The weight average molecular weight of the synthetic polyisoprene (A) is preferably 100,000 to 3,000,000, more preferably 400,000 to 2,500,000, further preferably 700,000 to 2,000,000, particularly preferably 1,000,000 to 1,500,000 in terms of standard polystyrene by gel permeation chromatography analysis. The weight average molecular weight of the synthetic polyisoprene (A) is in the range, thereby resulting in a more enhancement in film formability in dip forming of any synthetic polyisoprene latex obtained by mixing with the synthetic polyisoprene (B), resulting in a more enhancement in tensile strength of the resulting dip formed article.

The synthetic polyisoprene (A) is here synthesized by use of the Ziegler type catalyst, and the weight average molecular weight thereof tends to be relatively lower due to the action of the Ziegler type catalyst. Thus, the weight average molecular weight of the synthetic polyisoprene (A) can be lower than that of the synthetic polyisoprene (B).

Examples of the method for further controlling the weight average molecular weight of the synthetic polyisoprene (A) include a method including adjusting the molecular weight of an isoprene chain by use of a deactivator in solution polymerization of isoprene and, if necessary, other ethylenically unsaturated monomer copolymerizable therewith.

The deactivator is not particularly limited, and examples can include compounds having active hydrogen, for example, water; alcohols such as methanol, ethanol, propyl alcohol, butanol, ethylene glycol, propylene glycol and glycerin; and phenols such as phenol, cresol, α,β-naphthanol, nonylphenol and t-butyl-hydroxytoluene. Among them, water and alcohols are preferable, and water is particularly preferable. Such deactivators can be used singly or in combinations of two or more kinds thereof.

The method for adding the deactivator is not particularly limited, examples include a method where, in the case of solution polymerization of isoprene and, if necessary, other ethylenically unsaturated monomer copolymerizable therewith in an inert organic solvent, an organic solvent including the deactivator is used as such an inert organic solvent, and a method including adding the deactivator in solution polymerization, and a method where an organic solvent including the deactivator is used as the organic solvent is preferable from the viewpoint that the molecular weight of an isoprene chain can be more favorably controlled.

In the case of use of an organic solvent including the deactivator, the content rate of the deactivator in the organic solvent is preferably 1 to 100 ppm by weight, more preferably 5 to 50 ppm by weight, further preferably 10 to 30 ppm by weight.

The method for adjusting the content rate of the deactivator in the organic solvent in the range is not particularly limited, and examples include a method including bringing the organic solvent into contact with a drying agent such as a molecular sieve, to adjust the amount of water in the organic solvent, in the case of use of water as the deactivator.

The polymer Mooney viscosity ($ML_{1+4}$, 100° C.) of the synthetic polyisoprene (A) is preferably 50 to 80, more preferably 60 to 80, further preferably 70 to 80.

Examples of a specific method for providing the Ziegler-derived synthetic polyisoprene latex include (1) a method for producing the latex of synthetic polyisoprene (A), where a solution or a fine suspension obtained by dissolution or fine dispersion of the synthetic polyisoprene (A) which is once coagulated, in an organic solvent, is emulsified in water in the presence of a surfactant and, if necessary, the organic solvent is removed, and (2) a method for producing the latex of synthetic polyisoprene (A), where a polymer solution of the synthetic polyisoprene (A) obtained by solution polymerization, in the presence of a Ziegler type catalyst, of single isoprene dissolved in an organic solvent, or a mixture of isoprene dissolved in an organic solvent, with an ethylenically unsaturated monomer copolymerizable therewith, is directly emulsified by use of an aqueous surfactant solution. Among them, the production method (1) is preferable from the viewpoint that synthetic polyisoprene (A) high in the rate of the cis bond unit in the isoprene unit can be used and a dip formed article excellent in mechanical properties such as tensile strength is easily obtained.

Examples of the organic solvent for use in the production method (1) can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as pentane, hexane and heptane; and halogenated hydrocarbon solvents such as methylene chloride, chloroform and ethylene dichloride. Among them, aliphatic hydrocarbon solvents are preferable, hexane is more preferable, and n-hexane is particularly preferable.

The amount of the organic solvent to be used is here preferably 2,000 parts by weight or less, more preferably 20 to 1,500 parts by weight, further preferably 500 to 1500 based on 100 parts by weight of the synthetic polyisoprene (A).

Examples of the surfactant for use in the production method (1) include anionic surfactants, for example, fatty acid salts such as sodium laurate, potassium myristate, sodium palmitate, potassium oleate, sodium linoleate and sodium rosinate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate and potassium cetylbenzenesulfonate; alkylsulfosuccinic acid salts such as sodium di(2-ethylhexyl)sulfosuccinate, potassium di(2-ethylhexyl)sulfosuccinate and sodium dioctyl sulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; and monoalkylphosphoric acid salts such as sodium lauryl phosphate and potassium lauryl phosphate.

Among these anionic surfactants, fatty acid salts, alkylbenzenesulfonic acid salts, alkylsulfosuccinic acid salts, alkylsulfuric acid ester salts and polyoxyethylene alkyl ether sulfuric acid ester salts are preferable, fatty acid salts and alkylbenzenesulfonic acid salts are more preferable, fatty acid salts are further preferable, and rosinates such as sodium rosinate and potassium rosinate are particularly preferable.

It is preferable to use at least one selected from the group consisting of alkylbenzenesulfonic acid salts, alkylsulfosuccinic acid salts, alkylsulfuric acid ester salts and polyoxyethylene alkyl ether sulfuric acid ester salts in combination with any fatty acid salt, and it is particularly preferable to use any alkylbenzenesulfonic acid salt in combination with any fatty acid salt, because a polymerization catalyst (in particular, aluminum and titanium) remaining in a trace amount, caused by the synthetic polyisoprene (A), can be more efficiently removed and generation of an aggregate in production of a latex composition is suppressed. Preferable fatty acid salts are sodium rosinate and potassium rosinate, and preferable alkylbenzenesulfonic acid salts are sodium dodecylbenzenesulfonate and potassium dodecylbenzenesulfonate. Such surfactants may be used singly or in combinations of two or more kinds thereof.

As described above, at least one selected from the group consisting of alkylbenzenesulfonic acid salts, alkylsulfosuccinic acid salts, alkylsulfuric acid ester salts and polyoxyethylene alkyl ether sulfuric acid ester salts is used in combination with any fatty acid salt, thereby allowing the resulting latex to contain at least one selected from alkylbenzenesulfonic acid salts, alkylsulfosuccinic acid salts, alkylsulfuric acid ester salts and polyoxyethylene alkyl ether sulfuric acid ester salts, and any fatty acid salt.

Any surfactant other than the anionic surfactant may also be used in combination in the production method (1), and examples of such any surfactant other than the anionic surfactant include copolymerizable surfactants such as α,β-unsaturated carboxylic acid sulfoester, α,β-unsaturated carboxylic acid sulfate ester and sulfoalkyl aryl ether.

Furthermore, any nonionic surfactant such as polyoxyethylene alkyl ether, polyoxyethylene alkyl phenol ether, polyoxyethylene alkyl ester and polyoxyethylene sorbitan alkyl ester may also be used in combination as long as coagulation by the coagulating agent for use in dip forming is not impaired.

The amount of the anionic surfactant for use in the production method (1) is preferably 0.1 to 50 parts by weight, more preferably 0.5 to 30 parts by weight based on 100 parts by weight of the synthetic polyisoprene (A). In the case of use of two or more kinds of such surfactants, the total amount thereof to be used is preferably in the range. That is, for example, in the case of use of at least one selected from alkylbenzenesulfonic acid salts, alkylsulfosuccinic acid salts, alkylsulfuric acid ester salts and polyoxyethylene alkyl ether sulfuric acid ester salts in combination with any fatty acid salt, the total amount thereof to be used is preferably in the above range. A too small amount of the anionic surfactant to be used may cause a large amount of an aggregate in emulsification to be generated, and on the contrary, a too large amount of the anionic surfactant to be used can cause foaming to easily occur, resulting in generation of pinholes in the resulting dip formed article.

In the case of use of at least one selected from alkylbenzenesulfonic acid salts, alkylsulfosuccinic acid salts, alkylsulfuric acid ester salts and polyoxyethylene alkyl ether sulfuric acid ester salts in combination with any fatty acid salt, as the anionic surfactant, the ratio thereof to be used, "fatty acid salt": "total surfactant of at least one selected from alkylbenzenesulfonic acid salts, alkylsulfosuccinic acid salts, alkylsulfuric acid ester salts and polyoxyethylene alkyl ether sulfuric acid ester salts" on a weight ratio is preferably in the range of 1:1 to 10:1, more preferably in the range of 1:1 to 7:1. A too high ratio of at least one surfactant selected from alkylbenzenesulfonic acid salts, alkylsulfosuccinic acid salts, alkylsulfuric acid ester salts and polyoxyethylene alkyl ether sulfuric acid ester salts may result in vigorous foaming in handling of the synthetic polyisoprene, resulting in a need for an operation such as standing for a long time or addition of any defoamer, thereby leading to deterioration in workability and an increase in the cost.

The amount of water for use in the production method (1) is preferably 10 to 1,000 parts by weight, more preferably 30 to 500 parts by weight, most preferably 50 to 100 based on 100 parts by weigh of the solution of the synthetic polyisoprene (A) in the organic solvent. Examples of the type of water to be used include hard water, soft water, ion-exchange water, distilled water and zeolite water, and soft water, ion-exchange water and distilled water are preferable.

Any apparatus which is a generally commercially available emulsifying machine or dispersing machine can be used, without any particular limitations, as the apparatus for emulsification of the solution or the fine suspension of the synthetic polyisoprene (A) dissolved or finely dispersed in the organic solvent, in water in the presence of the surfactant. The method for adding the surfactant to the solution or fine suspension of the synthetic polyisoprene (A) is not particularly limited, and the surfactant may be added to any one of or both water and the solution or fine suspension of the synthetic polyisoprene (A) in advance, may be added to an emulsified liquid during an emulsifying operation, or may be added collectively or in portions.

Examples of the emulsifying apparatus include batch type emulsifying machines such as trade name "Homogenizer" (manufactured by IKA), trade name "Polytron" (manufactured by Kinematica) and trade name "TK Auto Homomixer" (manufactured by Primix Corporation); continuous emulsifying machines such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) and trade name "Fine flow mill" (manufactured by Pacific Machinery & Engineering Co., Ltd.); high-pressure emulsifying machines such as trade name "Microfluidizer" (manufactured by Mizuho Industrial Co., Ltd.), trade name "Nanomizer" (manufactured by Nanomizer Inc.) and trade name "APV Gaulin" (manufactured by APV Gaulin Inc.); membrane emulsifying machines such as trade name "Membrane emulsifying machine" (manufactured by Reica Co., Ltd.); vibration type emulsifying machines such as trade name "Vibromixer" (manufactured by Reica Co., Ltd.); and ultrasonic emulsifying machines such as trade name "Ultrasonic homogenizer" (manufactured by Branson Ultrasonics, Emerson Japan, Ltd.). Herein, the emulsifying operation conditions by the emulsifying apparatus are not particularly limited, and the treatment temperature and the treatment time may be appropriately selected so that a desired dispersing state is achieved.

In the production method (1), the organic solvent is desirably removed from an emulsified product obtained through the emulsifying operation.

The method for removing the organic solvent from the emulsified product is preferably a method which enables the content of the organic solvent (preferably alicyclic hydrocarbon solvent) in the resulting Ziegler-derived synthetic polyisoprene latex to be 500 ppm by weight or less, and, for example, a method of distillation under reduced pressure, atmospheric distillation, steam distillation or centrifugation can be adopted.

After removal of the organic solvent, if necessary, any concentrating operation may be conducted by a method of distillation under reduced pressure, atmospheric distillation, centrifugation, membrane concentration or the like in order to increase the solid content concentration of the Ziegler-derived synthetic polyisoprene latex, and in particular, centrifugation is preferably performed from the viewpoint that not only the solid content concentration in the Ziegler-derived synthetic polyisoprene latex can be increased, but also the remaining amount of the surfactant in the Ziegler-derived synthetic polyisoprene latex can be reduced.

Centrifugation is preferably performed, for example, with a continuous centrifuge machine in conditions of a preferable centrifugal force of 100 to 10,000 G, a preferable solid content concentration of the Ziegler-derived synthetic polyisoprene latex before centrifugation, of 2 to 15% by weight, a preferable flow rate for feeding to the centrifuge machine, of 500 to 1700 Kg/hr, and a preferable back pressure (gauge pressure) of the centrifuge machine, of 0.03 to 1.6 MPa, and the latex of synthetic polyisoprene (A) can be obtained as a light liquid after centrifugation. Thus, the remaining amount of the surfactant in the latex of synthetic polyisoprene (A) can be reduced.

The solid content concentration in the Ziegler-derived synthetic polyisoprene latex is preferably 30 to 70% by weight, more preferably 40 to 70% by weight. The solid content concentration can be in the range, thereby allowing the Ziegler-derived synthetic polyisoprene latex to be more favorably transferred in a pipe arrangement and/or stirred in a formulating tank, and also allowing strength of the resulting dip formed article to be more enhanced.

The volume average particle size of the Ziegler-derived synthetic polyisoprene latex is preferably 0.1 to 10 μm, more preferably 0.5 to 3.0 μm, further preferably 0.5 to 2.0 μm. The volume average particle size can be in the range, thereby imparting a proper latex viscosity to thereby facilitate handling, and inhibiting a film from being generated on the latex surface in storage of the Ziegler-derived synthetic polyisoprene latex.

To the Ziegler-derived synthetic polyisoprene latex may be compounded additive(s) commonly compounded in the latex field, such as a pH adjuster, a defoamer, a preservative, a cross-linking agent, a chelating agent, an oxygen scavenger, a dispersing agent and an antioxidant.

Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and any alkali metal hydroxide or ammonia is preferable.

Organic Alkali Metal-Derived Synthetic Polyisoprene Latex

Next, the latex of synthetic polyisoprene (B) (organic alkali metal-derived synthetic polyisoprene latex) for use in the production method of the present invention is described.

The synthetic polyisoprene (B) constituting the organic alkali metal-derived synthetic polyisoprene latex for use in the production method of the present invention may be synthesized by use of an organic alkali metal catalyst, and can be obtained by solution polymerization of isoprene and, if necessary, other ethylenically unsaturated monomer copolymerizable therewith in an inert organic solvent by use of an organic alkali metal catalyst. While a polymer solution of the synthetic polyisoprene obtained by solution polymerization may be used for production of the latex of synthetic polyisoprene (B) after a solid synthetic polyisoprene (B) is taken out by coagulation from the polymer solution once and thereafter re-dissolved in an organic solvent, the polymer solution is preferably used as it is for production of the latex of synthetic polyisoprene (B).

Here, impurities such as a residue of a polymerization catalyst, remaining in the polymer solution after synthesis, may be removed. An antioxidant described below may also be added to a solution during polymerization or after polymerization.

The organic alkali metal catalyst for use in synthesis of the synthetic polyisoprene (B) is not particularly limited, and examples include organomonolithium compounds such as n-butyllithium, sec-butyllithium, t-butyllithium, hexyllithium, phenyllithium and stilbene lithium; organic polyvalent lithium compounds such as dilithiomethane, 1,4-dilithiobutane, 1,4-dilithio-2-ethylcyclohexane, 1,3,5-trilithiobenzene and 1,3,5-tris(lithiomethyl)benzene; organosodium compounds such as sodium naphthalene; and organopotassium compounds such as potassium naphthalene. Among them, any organomonolithium compound is preferably used, and n-butyllithium is more preferably used. Such organic alkali metal catalysts can be each used singly or in combinations of two or more kinds thereof.

The method for adding the organic alkali metal catalyst may be, for example, a method including adding the organic alkali metal catalyst, as it is, to a reaction vessel charged with monomer(s) (isoprene, and an ethylenically unsaturated monomer copolymerizable with isoprene, if necessary used), or a method including adding the organic alkali metal catalyst being dissolved in an inert solvent such as hexane.

The amount of the organic alkali metal catalyst to be used is usually in the range of 1 to 50 mmol, preferably 2 to 20 mmol, more preferably 4 to 15 mmol per 1000 g of monomer(s) for use in polymerization (isoprene, and an ethylenically unsaturated monomer copolymerizable with isoprene, if necessary used).

The synthetic polyisoprene (B) may be synthesized by use of the Above-mentioned organic alkali metal catalyst, and may be a homopolymer of isoprene or may be copolymerized with other ethylenically unsaturated monomer copolymerizable with isoprene, as in the synthetic polyisoprene (A).

The content of the isoprene unit in the synthetic polyisoprene (B), the content rate of the cis bond unit in the isoprene unit included in the synthetic polyisoprene (B), and the polymer Mooney viscosity ($ML_{1+4}$, 100° C.) of the synthetic polyisoprene (B) can be the same as in the synthetic polyisoprene (A).

The weight average molecular weight of the synthetic polyisoprene (B) is preferably 1,000,000 to 5,000,000, more preferably 1,500,000 to 4,500,000, further preferably 2,000,000 to 4,000,000, particularly preferably 2,500,000 to 3,500,000 in terms of standard polystyrene by gel permeation chromatography analysis. The weight average molecular weight of the synthetic polyisoprene (B) can be in the range, resulting in a tendency to not only more enhance tensile strength of the resulting dip formed article, but also easily produce the latex of synthetic polyisoprene (B) by use of the organic alkali metal catalyst.

Examples of the method for controlling the weight average molecular weight of the synthetic polyisoprene (B) in the above range include a method including adjusting the molecular weight of an isoprene chain by use of a deactivator as in the synthetic polyisoprene (A). In such a case, a method where an organic solvent including the deactivator is used as an organic solvent for use in solution polymerization is preferable.

In the case of use of an organic solvent including the deactivator, the content rate of the deactivator in the organic solvent is preferably 0.1 to 50 ppm by weight, more preferably 1 to 30 ppm by weight, further preferably 2 to 15 ppm by weight. Examples of the method for adjusting the content rate of the deactivator in the organic solvent include a method including bringing the organic solvent into contact with a drying agent such as a molecular sieve.

Examples of the method for controlling the weight average molecular weight of the synthetic polyisoprene (B) in the above range also include a method including adjusting the amount of the organic alkali metal catalyst for use in solution polymerization. Specifically, a larger amount of the organic alkali metal catalyst to be used tends to result in an increase in the starting point of polymerization due to the action of the organic alkali metal catalyst, thereby allowing the weight average molecular weight of the resulting synthetic polyisoprene (B) to be lower. On the other hand, a smaller amount of the organic alkali metal catalyst to be used tends to result in a decrease in the starting point of polymerization, thereby allowing the weight average molecular weight of the resulting synthetic polyisoprene (B) to be higher. Thus, the amount of the organic alkali metal catalyst to be used can be adjusted to thereby allow the weight average molecular weight of the synthetic polyisoprene (B) to be controlled.

Examples of a specific method for providing the organic alkali metal-derived synthetic polyisoprene latex include (1) a method for producing the latex of synthetic polyisoprene (B), where a solution or a fine suspension obtained by dissolution or fine dispersion of the synthetic polyisoprene (B) which is once coagulated, in an organic solvent, is emulsified in water in the presence of a surfactant and, if necessary, the organic solvent is removed, and (2) a method for producing the latex of synthetic polyisoprene (B), where a polymer solution of the synthetic polyisoprene (B) obtained by solution polymerization, in the presence of the organic alkali metal catalyst, of single isoprene dissolved in an organic solvent, or a mixture of isoprene dissolved in an organic solvent, with an ethylenically unsaturated monomer copolymerizable therewith, is directly emulsified by use of an aqueous surfactant solution, as in the synthetic polyisoprene (A). Among them, the production method (2) which can provide a latex without any coagulation is preferable from the viewpoint that the synthetic polyisoprene (B) can be prevented from being degraded due to heat history applied in coagulation of the synthetic polyisoprene (B) (for example, heat applied for drying the synthetic polyisoprene (B)).

The organic solvent for use in the production method (2) can be the same as in the case of the synthetic polyisoprene (A), aliphatic hydrocarbon solvents are preferable, hexane is more preferable, and n-hexane is particularly preferable.

The amount of the organic solvent to be used is here preferably 2,000 parts by weight or less, more preferably 20 to 1,500 parts by weight, further preferably 500 to 1500 based on 100 parts by weight of the total of isoprene, and an ethylenically unsaturated monomer copolymerizable with isoprene, if necessary used.

Examples of the surfactant for use in the production method (2) can include those as in the case of the synthetic polyisoprene (A), and the anionic surfactant is suitable and rosinates such as sodium rosinate and potassium rosinate are particularly preferable.

It is preferable to use at least one selected from the group consisting of alkylbenzenesulfonic acid salts, alkylsulfosuccinic acid salts, alkylsulfuric acid ester salts and polyoxyethylene alkyl ether sulfuric acid ester salts in combination with any fatty acid salt, as in the case of the synthetic polyisoprene (A).

The amount of the anionic surfactant for use in the production method (2) is preferably 3 to 15 parts by weight, more preferably 5 to 10 parts by weight based on 100 parts by weight of the synthetic polyisoprene (B). In the case of use of two or more kinds of such surfactants, the total amount thereof to be used is preferably in the range. A too small amount of the anionic surfactant to be used may cause a large amount of an aggregate in emulsification to be generated, and on the contrary, a too large amount of the anionic surfactant to be used can cause foaming to easily occur, resulting in generation of pinholes in the resulting dip formed article.

In the case of use of at least one selected from alkylbenzenesulfonic acid salts, alkylsulfosuccinic acid salts, alkylsulfuric acid ester salts and polyoxyethylene alkyl ether sulfuric acid ester salts in combination with any fatty acid salt, in the anionic surfactant, the ratio thereof to be used can be the same as in the case of the synthetic polyisoprene (A).

The amount of water in the aqueous surfactant solution for use in the production method (2) is preferably 30 to 150 parts by weight, more preferably 40 to 100 parts by weight, most preferably 50 to 70 based on 100 parts by weight of the polymer solution of the synthetic polyisoprene (B). Examples of the type of water to be used include hard water, soft water, ion-exchange water, distilled water and zeolite water, and soft water, ion-exchange water and distilled water are preferable.

Examples of the apparatus for direct emulsification of the polymer solution of the synthetic polyisoprene (B) by use of the aqueous surfactant solution can include the same as in the case of the synthetic polyisoprene (A). The method for adding the surfactant of the synthetic polyisoprene (B) to the polymer solution is not particularly limited, and the surfactant may be added to any one of or both water and the polymer solution of the synthetic polyisoprene (B) in advance, may be added to an emulsified liquid during an emulsifying operation, or may be added collectively or in portions.

In the method for producing the organic alkali metal-derived synthetic polyisoprene latex, the organic alkali metal-derived synthetic polyisoprene latex is preferably obtained by removing the organic solvent from an emulsified product obtained through the emulsifying operation. The method for removing the organic solvent from the emulsified product is not particularly limited, and, for example, a method of distillation under reduced pressure, atmospheric distillation, steam distillation or centrifugation can be adopted.

After removal of the organic solvent, if necessary, any concentrating operation may be conducted by a method of distillation under reduced pressure, atmospheric distillation, centrifugation, membrane concentration or the like in order to increase the solid content concentration of the organic alkali metal-derived synthetic polyisoprene latex.

The solid content concentration of the organic alkali metal-derived synthetic polyisoprene latex is preferably 30 to 70% by weight, more preferably 40 to 70% by weight. The solid content concentration can be in the range, thereby allowing the organic alkali metal-derived synthetic polyisoprene latex to be more favorably transferred in a pipe arrangement and/or stirred in a formulating tank, and also allowing strength of the resulting dip formed article to be more enhanced.

The volume average particle size of the organic alkali metal-derived synthetic polyisoprene latex is preferably 0.1 to 10 μm, more preferably 0.5 to 3.0 μm, further preferably 0.5 to 2.0 μm. The volume average particle size can be in the range, thereby imparting a proper latex viscosity to thereby facilitate handling, and inhibiting a film from being generated on the latex surface in storage of the organic alkali metal-derived synthetic polyisoprene latex.

To the organic alkali metal-derived synthetic polyisoprene latex may be compounded additive(s) commonly compounded in the latex field, such as a pH adjuster, a defoamer, a preservative, a cross-linking agent, a chelating agent, an oxygen scavenger, a dispersing agent and an antioxidant. Examples of the pH adjuster can include those as in the synthetic polyisoprene (A), and any alkali metal hydroxide or ammonia is preferable.

Method for Producing Synthetic Polyisoprene Latex

The method for producing a synthetic polyisoprene latex of the present invention includes a step of mixing the above-mentioned latex of synthetic polyisoprene (A) (Ziegler-derived synthetic polyisoprene latex), and the above-mentioned latex of synthetic polyisoprene (B) (organic alkali metal-derived synthetic polyisoprene latex) at a weight ratio of "synthetic polyisoprene (A): synthetic polyisoprene 10:90 to 90:10".

According to the present invention, the Ziegler-derived synthetic polyisoprene latex and the organic alkali metal-derived synthetic polyisoprene latex can be mixed so that the weight ratio of the synthetic polyisoprene is in the range, thereby allowing film formability in dip forming by use of the resulting synthetic polyisoprene latex to be enhanced, to thereby allow the resulting dip formed article to be excellent in tensile strength and elongation and also have a flexible texture.

That is, while the synthetic polyisoprene (A) synthesized by use of the Ziegler type catalyst tends to have a relatively lower weight average molecular weight, the synthetic polyisoprene (B) synthesized by use of the organic alkali metal catalyst tends to have a relatively higher weight average molecular weight. Such synthetic polyisoprene (B) having a relatively higher weight average molecular weight is excellent in tensile strength of the synthetic polyisoprene (B) by itself, but dip forming by use of only the latex of synthetic polyisoprene (B) causes inferior film formability (specifically, causes insufficient adhesion between the synthetic polyisoprenes (B) in film formation), resulting in a reduction in tensile strength of the resulting dip formed article.

On the contrary, according to the present invention, such a latex of synthetic polyisoprene (B), having a relatively higher weight average molecular weight, can be mixed with such a latex of synthetic polyisoprene (A), having a relatively lower weight average molecular weight, to provide a synthetic polyisoprene latex, and the synthetic polyisoprene latex can be used in dip forming to thereby allow the synthetic polyisoprene (A) to act in film formation by dip forming so that adhesion of a particle of the synthetic polyisoprene (B) is imparted, to thereby allow film formability to be enhanced, resulting in an enhancement in tensile strength of the resulting dip formed article. That is, according to the present invention, a synthetic polyisoprene latex obtained by mixing the latex of synthetic polyisoprene (A) and the latex of synthetic polyisoprene (B) can be used to thereby allow high tensile strength due to the action of the synthetic polyisoprene (B) to be ensured with a reduction in tensile strength due to insufficient film formation being prevented due to the action of the synthetic polyisoprene (A) in dip forming.

In the present invention, the mixing ratio of the Ziegler-derived synthetic polyisoprene latex and the organic alkali metal-derived synthetic polyisoprene latex in the synthetic polyisoprene latex may be 10:90 to 90:10 as the weight ratio of "synthetic polyisoprene (A): synthetic polyisoprene (B)", and is preferably 20:80 to 80:20, more preferably 30:70 to 70:30, further preferably 40:60 to 60:40. A too high content rate of the synthetic polyisoprene (A) in the synthetic polyisoprene latex (a too low content rate of the synthetic polyisoprene (B)) causes the effect of enhancement of tensile strength due to the synthetic polyisoprene (B) to be insufficient, resulting in a reduction in tensile strength of the resulting dip formed article. On the other hand, a too low content rate of the synthetic polyisoprene (A) in the synthetic polyisoprene latex (a too high content rate of the synthetic polyisoprene (B)) causes the effect of enhancement of film formability due to the synthetic polyisoprene (A) to be insufficient, resulting in deterioration in film formability in dip forming by use of the synthetic polyisoprene latex.

The method for mixing the Ziegler-derived synthetic polyisoprene latex and the organic alkali metal-derived synthetic polyisoprene latex is not particularly limited, and the organic alkali metal-derived synthetic polyisoprene latex may be added to the Ziegler-derived synthetic polyisoprene latex, and vice versa. In the case of addition of one latex to the other latex, such latexes may be added collectively, in portions, or continuously.

It is noted that not a case where the Ziegler-derived synthetic polyisoprene latex and the organic alkali metal-derived synthetic polyisoprene latex are mixed to provide the synthetic polyisoprene latex as in the present invention, but a case where a mixed solution of a polymer solution of the synthetic polyisoprene (A) and a polymer solution of the synthetic polyisoprene (B) is emulsified by use of an aqueous surfactant solution to provide a latex causes deterioration in film formability in dip forming with the latex.

Latex Composition

The latex composition of the present invention is obtained by adding a cross-linking agent to the above-mentioned the synthetic polyisoprene latex of the present invention.

Examples of the cross-linking agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, N,N'-dithio-bis(hexahydro-2H-azepinone-2), phosphorus-containing polysulfide, polymeric polysulfide and 2-(4'-morpholinodithio)benzothiazole. Among them, sulfur can be preferably used. Such cross-linking agents can be used singly or in combinations of two or more kinds thereof.

The content of the cross-linking agent is not particularly limited, and is preferably 0.1 to 10 parts by weight, more preferably 0.2 to 3 parts by weight based on 100 parts by weight of the total of the synthetic polyisoprene (A) and the synthetic polyisoprene (B) constituting the synthetic polyisoprene latex. The content of the cross-linking agent can be in the range, thereby allowing tensile strength of the resulting dip formed article to be more enhanced.

The latex composition of the present invention preferably further contains a cross-linking accelerator.

A cross-linking accelerator usually used in dip forming can be used, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbarylthio)benzothiazole, 2-(2,6-dimethyl-4-morpholinothio)benzothiazole, 2-(4'-morpholino-dithio)benzothiazole, 4-morpholinyl-2-benzothiazyl-disulfide and 1,3-bis(2-benzothiazyl-mercaptomethyl)urea, and zinc diethyldithiocarbamate, zinc 2-dibutyldithiocarbamate and zinc 2-mercaptobenzothiazole are preferable. Such cross-linking accelerators can be used singly or in combinations of two or more kinds thereof.

The content of the cross-linking accelerator is preferably 0.05 to 5 parts by weight, more preferably 0.1 to 2 parts by weight based on 100 parts by weight of the total of the synthetic polyisoprene (A) and the synthetic polyisoprene (B) constituting the synthetic polyisoprene latex. The content of the cross-linking accelerator can be in the range, thereby allowing tensile strength of the resulting dip formed article to be more enhanced.

The latex composition of the present invention preferably further contains zinc oxide.

The content of the zinc oxide is not particularly limited, and is preferably 0.1 to 5 parts by weight, more preferably 0.2 to 2 parts by weight based on 100 parts by weight of the total of the synthetic polyisoprene (A) and the synthetic polyisoprene (B) constituting the synthetic polyisoprene latex. The content of the zinc oxide can be in the range, thereby allowing tensile strength of the resulting dip formed article to be more enhanced, with emulsification stability being favorable.

To the latex composition of the present invention can be, if necessary, further compounded a compounding agent, for example, an antioxidant, a dispersing agent; a reinforcement agent such as carbon black, silica or talc; a filler such as calcium carbonate or clay; an ultraviolet absorber; or a plasticizer.

Examples of the method for preparing the latex composition of the present invention include, but are not particularly limited, a method including mixing the cross-linking agent and various compounding agents, if necessary compounded, with the synthetic polyisoprene latex by use of a dispersing machine such as a ball mill, a kneader or a disper, and a method including preparing an aqueous dispersion liquid of a compounding component other than the synthetic polyisoprene latex, by use of the dispersing machine, and thereafter mixing the aqueous dispersion liquid with the synthetic polyisoprene latex.

The pH of the latex composition of the present invention is preferably 7 or more, more preferably in the range of 7 to 13, further preferably in the range of 8 to 12. The solid content concentration of the latex composition is preferably in the range of 15 to 65% by weight.

The latex composition of the present invention is preferably subjected to aging (pre-cross-linking) before dip forming from the viewpoint that mechanical properties of the resulting dip formed article are more enhanced. The pre-cross-linking time is not particularly limited, and is preferably 1 to 14 days, more preferably 1 to 7 days, depending on the pre-cross-linking temperature. The pre-cross-linking temperature is preferably 20 to 40° C.

The resultant is preferably stored at a temperature of 10 to 30° C. for the period from completion of the pre-cross-linking to dip forming. Storage of the resultant at a high temperature may cause a reduction in tensile strength of the resulting dip formed article.

Dip Formed Article

The dip formed article of the present invention is obtained by dip forming the latex composition of the present invention. Dip forming means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip formed article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold by heating is usually dried. The drying conditions may be appropriately selected.

Next, the deposit formed on the mold is cross-linked by heating.

While the heating conditions in cross-linking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

The mold is preferably washed with water or warm water in order to remove water-soluble impurities (for example, excessive surfactant and/or coagulating agent) before or after heating the mold on which the latex composition is deposited. The warm water used is preferably at 40° C. to 80° C., more preferably at 50° C. to 70° C.

The dip formed article after cross-linking is detached from the mold. Specific examples of the detaching method include a method for releasing the article from the mold by hand and a method for releasing the article by water pressure or compressed air pressure. In the case where the dip formed article during cross-linking has a sufficient strength for detaching, the dip formed article may be detached during cross-linking and continuously subsequently cross-linked.

The dip formed article of the present invention is obtained using a synthetic polyisoprene latex obtained according to the production method of the present invention, and thus is favorably formed into a film, and also is excellent in tensile strength and elongation and has a flexible texture. The dip formed article of the present invention can be particularly suitably used as, for example, a glove. In the case where the dip formed article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the dip formed article to thereby enhance slipping during detachment.

The dip formed article of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

Packaging Structure

The packaging structure of the present invention exhibits a structure that is obtained by performing adhesion and stacking of a first sheet substrate and a second sheet substrate each coated with the above-mentioned the synthetic polyisoprene latex of the present invention, and that can receive an object to be packaged. Specifically, the packaging structure of the present invention is a structure obtained by pushing the first sheet substrate and the second sheet substrate with a surface of the first sheet substrate and a surface of the second sheet substrate, coated with the synthetic polyisoprene latex (surfaces coated with the latex), being in contact with each other so that the surfaces coated with the latex are opposite to each other with an object to be packaged being, if necessary, interposed therebetween, to thereby allow the first sheet substrate and the second sheet substrate to adhere to each other, thereby enabling the object to be packaged, to be packaged. Examples of the object to be packaged include, but are not particularly limited, various objects to be packaged, which are desired to be sterilized, as medical products such as a plaster. Examples of the first sheet substrate and the second sheet substrate include, but are not particularly limited, a paper material such as glassine paper, a high-density polyethylene unwoven cloth, a polyolefin film, and a polyester film, and among them, a paper material is preferable and glassine paper is particularly preferable because such paper materials are excellent in handleability (have proper bendability) and are inexpensive.

EXAMPLES

Hereinafter, the present invention will be more specifically described with reference to Examples and Comparative Examples, but the present invention is not intended to be limited to such Examples. Hereinafter, "part(s)" is on a weight basis, unless particularly noted. Various physical properties were measured as follows.

Weight Average Molecular Weight (Mw)

A sample was diluted with tetrahydrofuran so that the solid content concentration was 0.1% by weight, and the resulting solution was subjected to gel permeation chromatography analysis, to thereby calculate the weight average molecular weight (Mw) in terms of standard polystyrene.

Solid Content Concentration 2 g of a sample was accurately weighed (weight: X2) in an aluminum dish (weight: X1), and dried in a hot air drier at 105° C. for 2 hours. Next, the dried product was cooled in a desiccator and weighed together with the aluminum dish (weight: X3), and the solid content concentration was calculated according to the following calculation expression.

Solid content concentration (% by weight)=
(X3−X1)×100/X2

Film Formability

After a glass mold covered with a coagulating agent was dipped in a composition for dip forming, the resultant was dipped in warm water and air dried to provide a film, a part of the film was subjected to observation of the interface of a synthetic polyisoprene particle by using a scanning electron microscope (SEM), and the film formability was evaluated according to the following criteria.

A: no interface of the synthetic polyisoprene particle was observed.

B: the interface of the synthetic polyisoprene particle was observed, but little observed.

C: the interface of the synthetic polyisoprene particle was slightly observed.

D: the interface of the synthetic polyisoprene particle was considerably observed.

Tensile Strength, Elongation at Breakage, and Tensile Stress at 500% of Dip Formed Article A film-shaped dip formed article having a thickness of about 0.2 mm was subjected to punching by a dumbbell (trade name "Super Dumbbell (Model: SDMK-100C)", manufactured by Dumbbell Co., Ltd.) to produce a test piece for tensile strength measurement, based on ASTM D412. The test piece was pulled at a tensile rate of 500 mm/min by a Tensilon universal tester (trade name "RTG-1210" manufactured by ORIENTEC Co., Ltd.) to measure the tensile strength (unit: MPa) immediately before breakage, the elongation (unit: %) immediately before breakage, and the tensile stress (unit: MPa) at a rate of elongation of 500%. A higher tensile strength and a higher elongation at breakage are more preferable. A lower tensile stress at 500% is more preferable because a dip formed article is more excellent in flexibility.

Production Example 1 (Production of Organic Alkali Metal-Derived Synthetic Polyisoprene Latex (b-1))

An autoclave dried and purged with nitrogen, and equipped with stirrer was charged with 1150 parts of n-hexane having a water content of 3 ppm by weight, dried by a molecular sieve, and 100 parts of isoprene. Next, the temperature in the autoclave was set to 60° C., 0.006 parts of n-butyllithium was added with stirring to allow a reaction to run for 2 hours, and thereafter 0.05 parts of methanol was added as a polymerization terminator, to terminate the reaction, thereby obtaining a solution of synthetic polyisoprene (B-1) in n-hexane. The weight average molecular weight of the synthetic polyisoprene (B-1) in the solution in n-hexane was 2,850,000.

Next, 1250 parts (100 parts in terms of synthetic polyisoprene (B-1)) of the resulting solution of synthetic polyisoprene (B-1) in n-hexane was heated to 60° C., and mixed with 1250 parts of an aqueous sodium rosinate solution having a concentration of 1.0% by weight, heated to 60° C., by use of a line mixer with the flow rate being adjusted so that the weight ratio was 1:1, and subsequently mixed by use of a homogenizer to thereby obtain an emulsified liquid.

Furthermore, the emulsified liquid was warmed to 80° C. under reduced pressure to distill off n-hexane, thereby obtaining a water dispersion liquid of synthetic polyisoprene (B-1). The resulting water dispersion liquid was subjected to centrifugation with a continuous centrifuge machine, thereby obtaining organic alkali metal-derived synthetic polyisoprene latex (b-1) having a solid content concentration of 65% by weight, as a light liquid.

Production Example 2 (Production of Ziegler-Derived Synthetic Polyisoprene Latex (a-1))

A solution of synthetic polyisoprene (A-1) in n-hexane was obtained in the same manner as in Production Example 1 except that 0.03 parts of titanium tetrachloride, 0.03 parts of triisobutyl aluminum and 0.005 parts of n-butyl ether were used instead of n-butyllithium, and the reaction temperature was changed from 60° C. to 30° C. The weight average molecular weight of synthetic polyisoprene (A-1) in the solution in n-hexane was 1,300,000.

Next, the resulting solution of synthetic polyisoprene (A-1) in n-hexane was coagulated in methanol, and thereafter dried in vacuum at 70° C. for 12 hours, thereby obtaining solid synthetic polyisoprene (A-1). Such solid synthetic polyisoprene (A-1) was re-dissolved in n-hexane to provide a solution having a concentration of 8% by weight. Thereafter, the resultant was mixed with an aqueous sodium rosinate solution having a concentration of 1.0% by weight by use of a line mixer with the flow rate being adjusted so that the weight ratio was 1:1, and subsequently mixed by use of a homogenizer to thereby obtain an emulsified liquid, and thereafter distillation off of n-hexane and centrifugation were performed, thereby obtaining Ziegler-derived synthetic polyisoprene latex (a-1) having a solid content concentration of 60% by weight, in the same manner as in Production Example 1.

Production Example 3 (Production of Ziegler-Derived Synthetic Polyisoprene Latex (a-2))

A solution of synthetic polyisoprene (A-2) in n-hexane was obtained in the same manner as in Production Example 2 except that 0.12 parts of ethylene was further added into the autoclave to allow a reaction to run. The weight average molecular weight of synthetic polyisoprene (A-2) in the solution of n-hexane was 800,000.

Next, the resulting solution of synthetic polyisoprene (A-2) in n-hexane was coagulated in methanol, and thereafter dried in vacuum at 70° C. for 12 hours, thereby obtaining solid synthetic polyisoprene (A-2). Such solid synthetic polyisoprene (A-2) was re-dissolved in n-hexane to provide a solution having a concentration of 8% by weight. Thereafter, the resultant was mixed with an aqueous sodium rosinate solution having a concentration of 1.0% by weight by use of a line mixer with the flow rate being adjusted so that the weight ratio was 1:1, and subsequently mixed by use of a homogenizer to thereby obtain an emulsified liquid, and thereafter distillation off of n-hexane and centrifugation were performed, thereby obtaining Ziegler-derived synthetic polyisoprene latex (a-2) having a solid content concentration of 61% by weight, in the same manner as in Production Example 1.

Production Example 4 (Production of Organic Alkali Metal-Derived Synthetic Polyisoprene Latex (b-2))

An autoclave dried and purged with nitrogen, and equipped with stirrer was charged with 1150 parts of n-hexane having a water content of 3 ppm by weight, dried by a molecular sieve, and 100 parts of isoprene. Next, the temperature in the autoclave was set to 60° C., 0.006 parts of n-butyllithium was added with stirring to allow a reaction to run for 2 hours, and thereafter 0.05 parts of methanol was added as a polymerization terminator, to terminate the reaction, thereby obtaining a solution of synthetic polyisoprene (B-2) in n-hexane. The weight average molecular weight of synthetic polyisoprene (B-2) in the solution in n-hexane was 2,850,000.

Next, the resulting solution of synthetic polyisoprene (B-2) in n-hexane was coagulated in methanol, and thereafter dried in vacuum at 70° C. for 12 hours, thereby obtaining solid synthetic polyisoprene (B-2). Such solid synthetic polyisoprene (B-2) was re-dissolved in n-hexane to provide a solution having a concentration of 8% by weight. Thereafter, the resultant was mixed with an aqueous sodium rosinate solution having a concentration of 1.0% by weight by use of a line mixer with the flow rate being adjusted so that the weight ratio was 1:1, and subsequently mixed by use of a homogenizer to thereby obtain an emulsified liquid, and thereafter distillation off of n-hexane and centrifugation were performed, thereby obtaining organic alkali metal-derived synthetic polyisoprene latex (b-2) having a solid content concentration of 64% by weight, in the same manner as in Production Example 1.

Example 1

Preparation of Synthetic Polyisoprene Latex

Organic alkali metal-derived synthetic polyisoprene latex (b-1) obtained in Production Example 1 and Ziegler-derived synthetic polyisoprene latex (a-1) obtained in Production Example 2 were mixed so that the weight ratio "synthetic polyisoprene (A-1): synthetic polyisoprene (B-1)" was 50:50, thereby obtaining a synthetic polyisoprene latex. Such a preparation method including mixing the organic alkali metal-derived synthetic polyisoprene latex and the Ziegler-derived synthetic polyisoprene latex to thereby obtain the synthetic polyisoprene latex is designated as "Latex mixing" in Table 1 (much the same is true on Examples 2 to 5 and Comparative Example 2 described below).

Preparation of Composition for Dip Forming

Added was sodium dodecylbenzenesulfonate having a concentration of 10% by weight with stirring of the synthetic polyisoprene latex so that the amount thereof in terms of the solid content was 1 part based on 100 parts of the total of synthetic polyisoprene (A-1) and synthetic polyisoprene (B-1), thereby obtaining a mixture. While the resulting mixture was stirred, 1.5 parts of zinc oxide, 1.5 parts of sulfur, 2 parts of an antioxidant (trade name "Wingstay L" manufactured by Goodyear Tire and Rubber Company), 0.3 parts of zinc diethyldithiocarbamate, 0.5 parts of zinc dibutyldithiocarbamate and 0.7 parts of a zinc salt of mercaptobenzothiazole, in terms of the solid content based on 100 parts of the total of synthetic polyisoprene (A-1) and synthetic polyisoprene (B-1) in the mixture, were added as water dispersion liquids of such respective compounding agents, and thereafter an aqueous potassium hydroxide solution was added to obtain a composition for dip forming, in which the pH was adjusted to 10.5. Thereafter, the resulting composition for dip forming was aged in a constant temperature water bath adjusted at 30° C. for 24 hours.

Production of Dip Formed Article

A glass mold with a frosted surface (having a diameter of about 5 cm and a length of a frosted portion of about 15 cm) was washed, pre-heated in an oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and taken out.

Next, the glass mold covered with the coagulating agent was dried in an oven at 70° C. Thereafter, the glass mold covered with the coagulating agent was taken out from the oven, dipped in the composition for dip forming, adjusted to 25° C., for 10 seconds and then taken out, and dried at room temperature for 60 minutes, thereby obtaining a glass mold covered with a film. The glass mold covered with a film was then dipped in warm water at 60° C. for 2 minutes, and thereafter air dried at room temperature for 30 minutes. The film air dried was partially subjected to evaluation of film formability according to the above method. The results are shown in Table 1.

Thereafter, the glass mold covered with a film was subjected to vulcanization by heating in an oven at 120° C. for 20 minutes. The glass mold covered with a film, subjected to vulcanization, was cooled to room temperature, talc was spread thereon, and thereafter the film subjected to vulcanization was peeled from the glass mold, thereby obtaining a dip formed article (rubber glove). The resulting dip formed article (rubber glove) was subjected to each measurement of the tensile strength, the elongation at breakage, and the stress at 500% elongation according to the above methods. The results are shown in Table 1.

Example 2

A film air dried and a dip formed article (rubber glove) were produced and evaluated in the same manner as in Example 1 except that Ziegler-derived synthetic polyisoprene latex (a-2) obtained in Production Example 3 was used instead of Ziegler-derived synthetic polyisoprene latex (a-1) obtained in Production Example 2 and mixing was made so that the weight ratio "synthetic polyisoprene (A-2): synthetic polyisoprene (B-1)" was 50:50, to thereby obtain a synthetic polyisoprene latex. The results are shown in Table 1.

Example 3

A film air dried and a dip formed article (rubber glove) were produced and evaluated in the same manner as in Example 2 except that organic alkali metal-derived synthetic polyisoprene latex (b-1) obtained in Production Example 1 and Ziegler-derived synthetic polyisoprene latex (a-2) obtained in Production Example 3 were mixed so that the weight ratio "synthetic polyisoprene (A-2): synthetic polyisoprene (B-1)" was 20:80, to thereby obtain a synthetic polyisoprene latex. The results are shown in Table 1.

Example 4

A film air dried and a dip formed article (rubber glove) were produced and evaluated in the same manner as in Example 2 except that organic alkali metal-derived synthetic polyisoprene latex (b-1) obtained in Production Example 1 and Ziegler-derived synthetic polyisoprene latex (a-2) obtained in Production Example 3 were mixed so that the weight ratio "synthetic polyisoprene (A-2): synthetic polyisoprene (B-1)" was 70:30, to thereby obtain a synthetic polyisoprene latex. The results are shown in Table 1.

Example 5

A film air dried and a dip formed article (rubber glove) were produced and evaluated in the same manner as in Example 4 except that organic alkali metal-derived synthetic polyisoprene latex (b-2) obtained in Production Example 4 was used instead of organic alkali metal-derived synthetic polyisoprene latex (b-1) obtained in Production Example 1. The results are shown in Table 1.

Comparative Example 1

First, solid synthetic polyisoprene (A-1) obtained in Production Example 2 and solid synthetic polyisoprene (B-2) obtained in Production Example 4 were loaded into a container so that the weight ratio was 50:50, and the resultant was dissolved in n-hexane, thereby obtaining a mixed solution of synthetic polyisoprene, having a concentration of 8% by weight.

The mixed solution of synthetic polyisoprene was mixed with an aqueous sodium rosinate solution having a concentration of 1.0% by weight by use of a line mixer with the flow rate being adjusted so that the weight ratio was 1:1, and subsequently mixed by use of a homogenizer to thereby obtain an emulsified liquid, and thereafter distillation off of n-hexane and centrifugation were performed, thereby obtaining a synthetic polyisoprene latex having a solid content concentration of 62% by weight, in the same manner as in Production Example 1. Such a preparation method including loading solid synthetic polyisoprene (A-1) and solid synthetic polyisoprene (B-2) into a container and dissolving them in n-hexane to provide a mixed solution of synthetic polyisoprene and then obtain a synthetic polyisoprene latex is designated as "Solution mixing" in Table 1.

Next, a film air dried and a dip formed article (rubber glove) were produced by use of the synthetic polyisoprene latex, and evaluated, in the same manner as in Example 1. The results are shown in Table 1.

Comparative Example 2

A film air dried and a dip formed article (rubber glove) were produced and evaluated in the same manner as in Example 1 except that organic alkali metal-derived synthetic polyisoprene latex (b-1) obtained in Production Example 1 and Ziegler-derived synthetic polyisoprene latex (a-1) obtained in Production Example 2 were mixed so that the weight ratio "synthetic polyisoprene (A-1): synthetic polyisoprene (B-1)" was 5:95, to thereby obtain a synthetic polyisoprene latex. The results are shown in Table 1.

TABLE 1

| | Example | | | | | Comparative Example | |
|---|---|---|---|---|---|---|---|
| | 1 | 2 | 3 | 4 | 5 | 1 | 2 |
| Compounding of synthetic polyisoprene latex | | | | | | | |
| Ziegler-derived synthetic polyisoprene latex (a-1) (Emulsification after dissolution*), Weight average molecular weight: 1,300,000) (parts) | 50 | | | | | 50 | 5 |
| Ziegler-derived synthetic polyisoprene latex (a-2) (Emulsification after dissolution*), Weight average molecular weight: 800,000) (parts) | | 50 | 20 | 70 | 70 | | |
| Organic alkali metal-derived synthetic polyisoprene latex (b-1) (Direct emulsification*), Weight average molecular weight: 2,850,000) (parts) | 50 | 50 | 80 | 30 | | | 95 |
| Organic alkali metal-derived synthetic polyisoprene latex (b-2) (Emulsification after dissolution*), Weight average molecular weight: 2,850,000) (parts) | | | | | 30 | 50 | |
| Method for preparing synthetic polyisoprene latex | Latex mixing | Latex mixing | Latex mixing | Latex mixing | Latex mixing | Solution mixing | Latex mixing |
| Evaluation | | | | | | | |
| Film formability | A | A | B | A | B | D | C |
| Tensile strength (MPa) | 28.0 | 25.0 | 23.0 | 22.0 | 20.0 | 21.0 | 17.0 |
| Tensile elongation (%) | 1120 | 980 | 940 | 880 | 910 | 990 | 880 |
| Tensile stress at 500% (MPa) | 1.8 | 1.7 | 1.8 | 1.6 | 1.9 | 1.9 | 1.6 |

*)In Table 1, "Emulsification after dissolution" means production by once coagulating and drying a polymer solution obtained by solution polymerization of a monomer, re-dissolving the resulting solid material in an organic solvent, and thereafter emulsifying the resultant. "Direct emulsification" means production by directly emulsifying a polymer solution obtained by solution polymerization of a monomer, without any coagulation.

As clear from Table 1, in the case where a synthetic polyisoprene latex obtained by mixing a latex of synthetic polyisoprene (A) synthesized by use of a Ziegler type catalyst and a latex of synthetic polyisoprene (B) synthesized by use of an organic alkali metal catalyst at a weight ratio of "synthetic polyisoprene (A): synthetic polyisoprene=10:90 to 90:10" was used, not only film formability in dip forming was excellent, but also the resulting dip formed article was excellent in tensile strength and elongation, and had a flexible texture (Examples 1 to 5).

On the other hand, in the case where a synthetic polyisoprene latex obtained by preparing a mixed solution of synthetic polyisoprene (A) synthesized by use of a Ziegler type catalyst and synthetic polyisoprene (B) synthesized by use of an organic alkali metal catalyst, and emulsifying the mixed solution was used, film formability in dip forming was inferior (Comparative Example 1).

Moreover, in the case where the content rate of synthetic polyisoprene (A) in the synthetic polyisoprene latex was too low (the content rate of synthetic polyisoprene (B) was too high), film formability in dip forming was inferior, resulting in a reduction in tensile strength of the resulting dip formed article (Comparative Example 2).

The invention claimed is:

1. A method for producing a synthetic polyisoprene latex, comprising:
   a step of mixing a latex of synthetic polyisoprene (A) synthesized by use of a Ziegler catalyst and a latex of synthetic polyisoprene (B) synthesized by use of an organic alkali metal catalyst at a weight ratio of "synthetic polyisoprene (A): synthetic polyisoprene (B)=10:90 to 90:10".

2. The method for producing a synthetic polyisoprene latex according to claim 1, wherein
   a weight average molecular weight of the synthetic polyisoprene (A) is 100,000 to 3,000,000, and
   a weight average molecular weight of the synthetic polyisoprene (B) is 1,000,000 to 5,000,000.

3. The method for producing a synthetic polyisoprene latex according to claim 1, wherein the latex of synthetic polyisoprene (A) is obtained by once coagulating a polymer solution of synthetic polyisoprene (A) obtained by solution polymerization, in the presence of the Ziegler catalyst, of isoprene dissolved in an organic solvent, to provide a solid material, re-dissolving the solid material in an organic solvent, and emulsifying the resultant obtained by re-dissolving by use of an aqueous surfactant solution.

4. The method for producing a synthetic polyisoprene latex according to claim 1, wherein the latex of synthetic polyisoprene (B) is obtained by directly emulsifying a polymer solution of synthetic polyisoprene (B) obtained by solution polymerization, in the presence of the organic alkali metal catalyst, of isoprene dissolved in an organic solvent, by use of an aqueous surfactant solution without any coagulation.

5. The method for producing a synthetic polyisoprene latex according to claim 1, wherein a catalytic system with titanium tetrachloride and an organoaluminum compound is used as the Ziegler catalyst.

6. The method for producing a synthetic polyisoprene latex according to claim 1, an organomonolithium compound is used as the organic alkali metal catalyst.

7. The method for producing a synthetic polyisoprene latex according to claim 1, wherein a solid content concentration of the latex of synthetic polyisoprene (A) is 30 to 70% by weight and a solid content concentration of the latex of synthetic polyisoprene (B) is 30 to 70% by weight in mixing of the latex of synthetic polyisoprene (A) and the latex of synthetic polyisoprene (B).

8. A method for producing a latex composition, comprising:
   a step of adding a cross-linking agent to a synthetic polyisoprene latex obtained by the method according to claim 1.

9. A method for producing a dip formed article, comprising:
   a step of dip forming a latex composition obtained by the method according to claim 8.

10. A method for producing a packaging structure that can receive an object to be packaged between a first sheet substrate and a second sheet substrate, comprising:
    coating the first sheet substrate and/or the second sheet substrate with a synthetic polyisoprene latex obtained by the method according to claim 1, to form a coating film, and performing adhesion and stacking of at least a part of the first sheet substrate and at least a part of the second sheet substrate thorough the coating film.

\* \* \* \* \*